Dec. 26, 1939.    R. F. PEO ET AL    2,184,398
LINK ASSEMBLY
Filed June 26, 1937
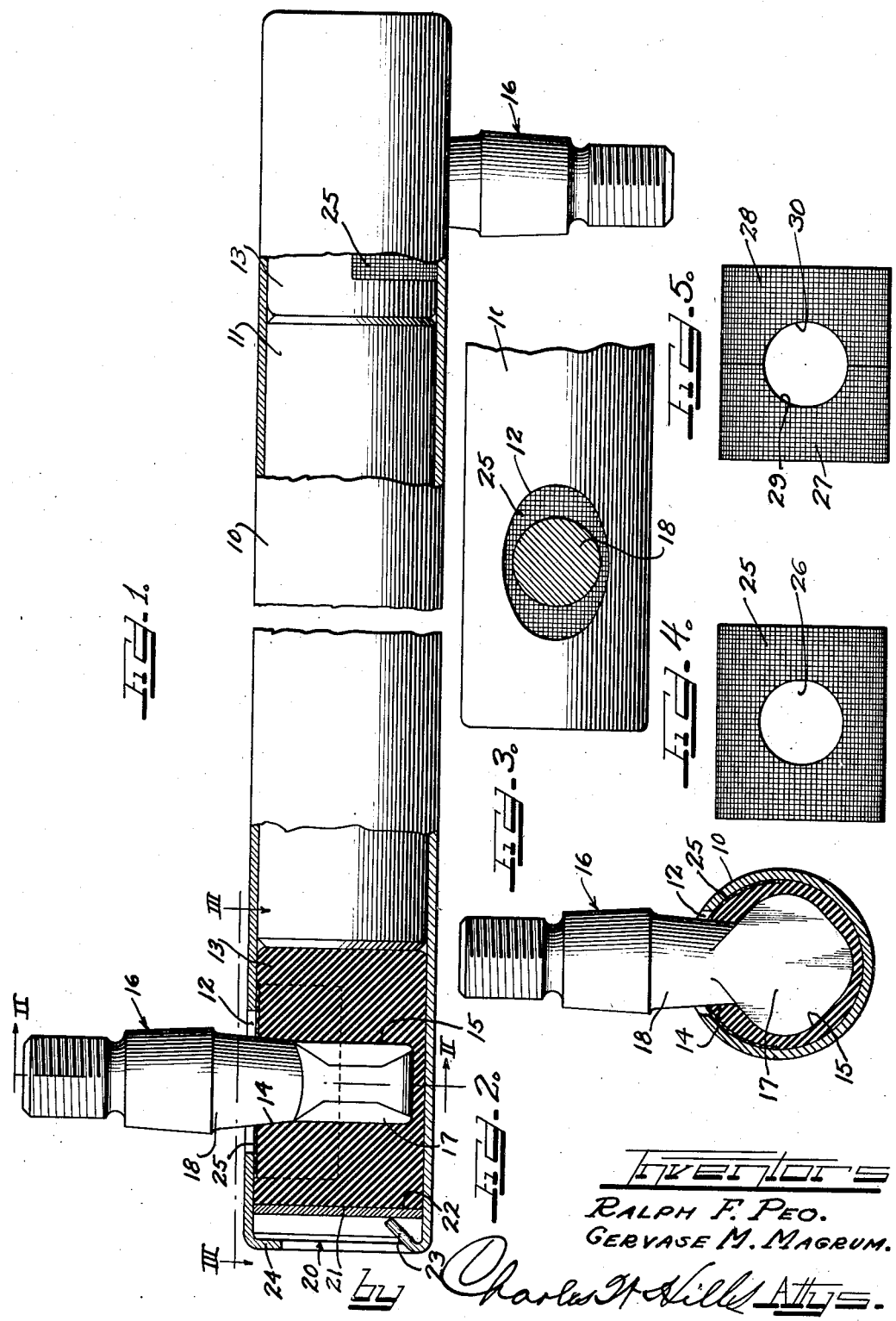
Inventors
RALPH F. PEO.
GERVASE M. MAGRUM.
by Charles H. Hill Attys.

Patented Dec. 26, 1939

2,184,398

UNITED STATES PATENT OFFICE 2,184,398

LINK ASSEMBLY

Ralph F. Peo and Gervase M. Magrum, Buffalo, N. Y., assignors to Houde Engineering Corporation, Buffalo, N. Y., a corporation of New York Application June 26, 1937, Serial No. 150,438

6 Claims. (Cl. 287—85)

This invention relates to link assemblies wherein a connecting arm, such as a stud, having an enlarged flattened head, is seated in a rubber bushing mounted in a housing with the major axis of the stud head at an angle to the major axis of the opening in the housing whereby the stud head is locked in the housing after being rotated at an angle to the major axis of the housing opening.

More particularly the invention relates to metal guard members for protecting the rubber bushings of such types of links.

In link assemblies and joints according to this invention, the housing for the rubber bushing contains an opening having a major axis longer than the major axis of the stud head and a minor axis shorter than the major axis of the stud head to permit insertion of the stud head in the bushing and to lock the stud head in the housing when it is rotated into seating position in the bushing. The rubber bushings are usually formed to fit snugly around the shank of the stud and therefore a portion of the bushing is exposed at the elongated opening in the housing member.

When the bushing is maintained under compression in the housing member the exposed portion may be squeezed from the housing and in any event will be deformed and possibly cut during articulation of the link members.

According to this invention a metal guard such as an open mesh screen is disposed over the bushing to cover the portion thereof exposed by the opening in the housing. The metal guard may be directly vulcanized to the bushing or may merely be interposed between the bushing and the housing at the opening of the housing.

The guard members increase the life of the rubber bushing considerably and make possible the use of cheaper rubber for the bushing material.

Since the guard members surround the shank of the stud they are provided with a central aperture for receiving the stud shank. This central aperture is materially smaller than the flat head of the stud but the guard material can be sufficiently deformed to permit insertion of the stud head therethrough. After the stud head has passed through the guard member, the rubber bushing tends to return the deformed metal back to nearly its original shape.

Alternatively the guard member may be made in two separate parts, each containing a semicircular aperture for defining together an opening through which the stud shank may operate. The two pieces forming the guard member readily spread apart from each other when the stud head is inserted through the aperture defined thereby.

We have found that relatively thin metal screening is an excellent material from which to form the guard members since the open meshes of the screen permit a secure seating of the guard on the rubber bushing and further facilitate a vulcanizing of the guard to the bushing. Screen material is more easily deformed when inserting the stud head through the aperture thereof and at the same time possesses sufficient strength to prevent extrusion of the rubber bushing through the opening in the housing.

It is then an object of this invention to provide metal guard members for protecting rubber bushings in link assemblies.

A further object of this invention is to provide link assemblies, including housing members having elongated openings giving entrance thereto and rubber bushings in the housings in alignment with the elongated openings, with metal guard members protecting the portions of the bushing exposed by the housing openings.

A further object of this invention is to provide wire mesh guard members for rubber bushings in link assemblies.

Another object of this invention is to provide a rubber bushing for a link assembly having a metal guard member vulcanized to the outer surface thereof.

Other and further objects of this invention will become apparent to those skilled in the art from the following detailed description of the annexed sheet of drawings which discloses a preferred embodiment of the invention.

On the drawing:

Figure 1 is a broken side elevational view, with parts shown in vertical cross-section, of a link assembly according to this invention.

Figure 2 is a cross-sectional view, with a part in elevation, taken along the line II—II of Figure 1.

Figure 3 is a cross-sectional view, with parts in elevation, taken along the line III—III of Figure 1.

Figure 4 is a top plan view of a wire mesh guard member according to this invention.

Figure 5 is a top plan view of a two-piece wire mesh guard member according to this invention.

As shown on the drawing:

In Figures 1 to 3, the reference numeral 10 designates a metal tube forming the housing member of the link assembly. A solid rod 11 is disposed in the tube 10 intermediate the ends thereof.

Elongated openings 12 are provided through the tube 10 near the ends thereof with the major axis of each opening extending longitudinally of the tube.

Rubber bushings 13 are mounted in each end of the tube 10 in abutting relation to the ends of the rod 11 in the tube.

The bushings 13 have circular openings 14 therein communicating with enlarged slots or recesses 15 formed in the central portion of the bushing. The recesses or slots 15 have the major axes thereof at right angles to the major axes of the openings 12 in the tube.

Stud members 16 extend from the tube 10 through the openings 12 thereof and have enlarged flat heads 17 seated in the recesses 15 of the bushing. Shanks 18 of the stud 16 snugly fit in the circular openings 14 of the bushing.

The stud heads 17 have the major axes thereof shorter than the major axes of the elongated openings 12 of the housing but longer than the minor axes of the openings 12. The studs 16 can therefore be inserted in the tube 10 through the openings 12 thereof and rotated into seated position in the bushing recesses 15. The stud heads will then be locked in the tube 10 since the major axes thereof are larger than the minor axes of the tube opening 12.

The bushings 13 are held against the ends of the rod 11 by means of discs 20 closing the ends of the tube 10. The discs 20 preferably have a bead portion 21 projecting therefrom for seating in a groove 22 formed in the outer end of the bushing. A portion 23 of the end of the tube 10 is pressed down into the groove provided by the bead 21 of the disc 20 to hold the disc against rotation relative to the tube. Since the bead 21 is seated in the groove 22 of the bushing, the bushing is likewise held against rotation in the tube and the opening 14 of the bushing will always be maintained in proper alignment to the opening 12 of the tube.

The remaining portion of the end of the tube 10 is spun or peened over the edge portion of the disc 20 as shown at 24. The bushings 13 are thus held between the rod 11 and the closure discs 20 and are unexposed around their entire exterior surfaces except at the openings 12 in the tube. If the bushings are maintained under compression or even if the studs 16 are moved relative to the tube, the unexposed portion of the bushings will be squeezed into the openings 12 of the housing and will thus become deformed, damaged and even cut off from the bushings.

According to this invention, therefore, the exposed portion of the bushings uncovered by the openings 12 is covered by a metal screen 25 having a central aperture 26 therein adapted to receive the stud therethrough. The metal screen 25 extends for a considerable distance around the bushing beyond the opening 12 so that it cannot bulge or work out of the opening.

The screen 25 is preferably vulcanized directly to the surface of the bushing 12 and can be bonded thereon when the bushings are first molded.

The stud head 17 of the stud can be jammed through the aperture 26 in the screen 25 since the screen material is deformable. However after the stud head has passed through the aperture the rubber bushing will tend to return the deformed screen material back to its original shape.

In the modification shown in Figure 5, the guard member is composed of two pieces of wire mesh or screen 27 and 28 each having a semi-circular portion 29 and 30 cut therefrom for defining a circular aperture when the pieces 27 and 28 are placed in mating relation. In this modification the stud head 17 can be inserted into the bushing 12 without deforming the screen material since the two pieces 27 and 28 will merely spread apart to permit insertion of the stud head.

The use of screen material for the guard members is even more desirable than the use of solid metal sheets since the screen can flex and will not interfere with movements of the stud. At the time it has sufficient strength to hold the bushing in the tube even when the bushing is placed under high compression.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A link construction comprising a tube having an elongated opening in the side wall thereof, a rod in said tube terminating in spaced relation from the opening, a resilient bushing in the tube abutting the rod, said bushing having an elongated slot therein communicating with said opening in the tube, said slot having the long axis thereof at an angle to the long axis of the tube opening, a stud having a shank extending through said tube opening and an enlarged flattened head seated in said slot of the bushing, a metal guard disposed between the bushing and the tube surrounding the shank of the stud for covering the portion of the bushing exposed by the elongated opening in the tube, and means abutting the other end of the bushing to close the end of the tube and hold the bushing in the tube against the rod.

2. A link assembly comprising a cylindrical housing having an opening in the side wall thereof giving entrance thereto, a cylindrical block of resilient rubber in said housing, and a stud extending through the opening in the housing seated at its end against said rubber block, the improvement which comprises a wire mesh screen disposed between the block and housing to cover the portion of the block exposed by the housing opening for preventing extrusion of the block material through the opening.

3. In a link assembly of the type including a housing having an elongated opening giving entrance thereto, a resilient rubber bushing in the housing having a recess with the major axis thereof at an angle to the major axis of the housing opening and a stud having a flattened head seated in said recess of the bushing with the major axis of the stud head shorter than the major axis of the housing opening but longer than the minor axis of the housing opening whereby the stud head can be inserted through the housing opening, rotated through an angle to be seated in the recess provided by the bushing and locked in the housing because of the angular displacement of the recess from the major axis of the housing opening, the improvement which comprises a deformable metal sheet held between the housing and bushing to cover the portion of the bushing exposed by the housing opening, said metal sheet having an opening smaller than the stud head but being deformable to permit insertion of the stud head.

4. A bushing for a link assembly comprising a resilient rubber bushing having a recess therein and an opening giving entrance to the recess, a wire mesh screen secured to the outer surface of the bushing adjacent the opening, said screen having a central aperture therethrough in alignment with said opening.

5. A bushing for a link assembly comprising a bushing of resilient rubber having a recess therein and an opening giving entrance to the recess, two pieces of wire mesh screen vulcanized to the outer surface of the rubber bushing to cover an area of the bushing surrounding the opening therein, each of said pieces having a portion thereof cut away to define when assembled on the bushing an aperture in alignment with the opening in the bushing.

6. A link assembly comprising a housing having an opening giving entrance thereto, a resilient rubber bushing in said housing, and a stud extending through the opening of the housing seated in said rubber bushing, the improvement which comprises a wire mesh screen disposed between the bushing and the housing and surrounding said stud for preventing extrusion of the bushing material through the housing opening.

RALPH F. PEO.
GERVASE M. MAGRUM.